March 30, 1926.
C. F. LAGANKE
1,578,531
WINDSHIELD CLEANING APPARATUS
Filed Dec. 15, 1923    3 Sheets-Sheet 1
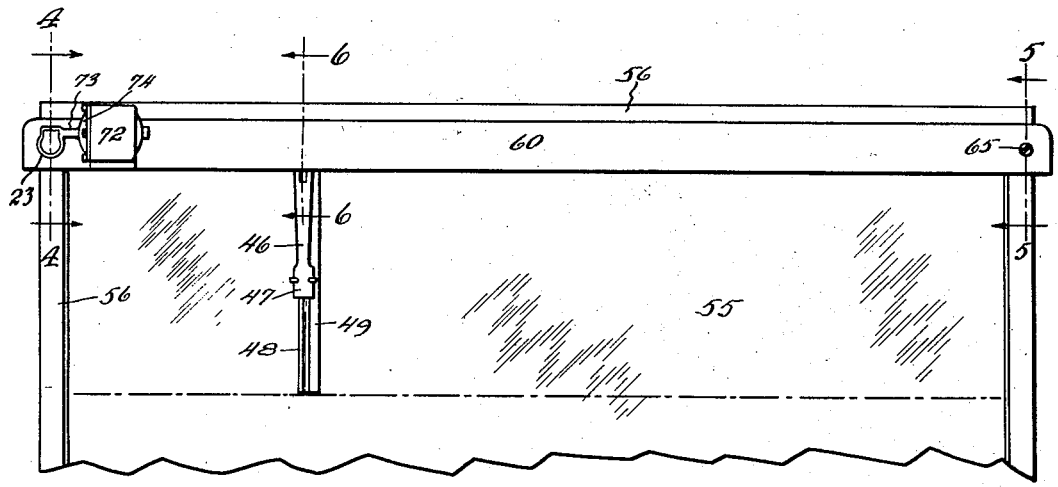
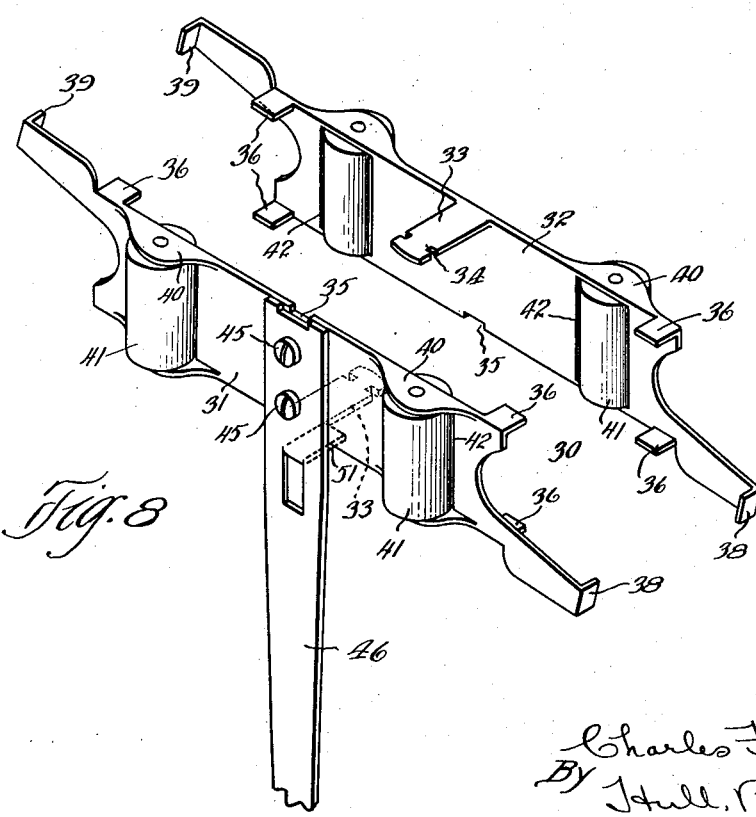
Inventor
Charles F. Laganke
By Hull, Brock & West
Attys.

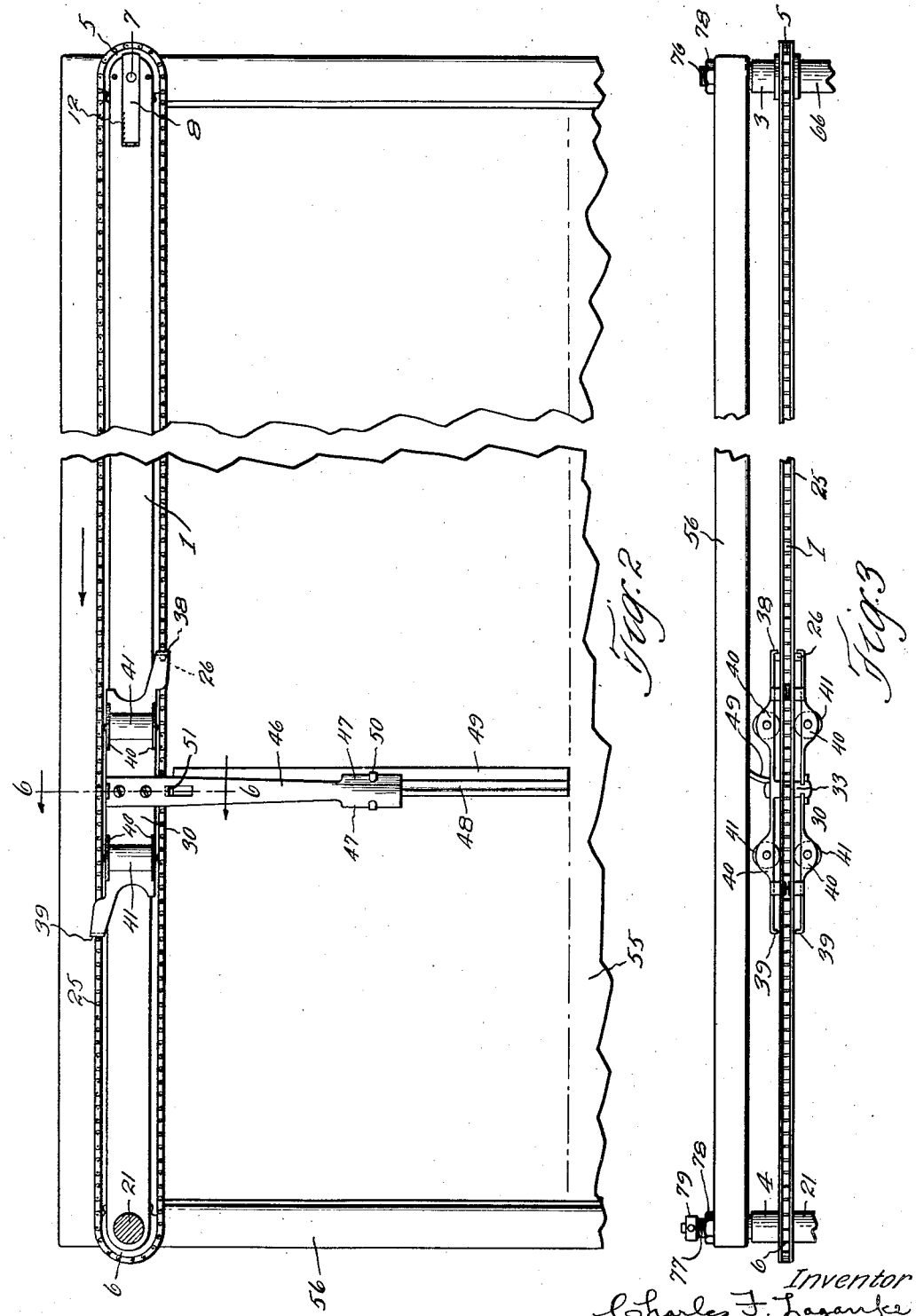

March 30, 1926. 1,578,531
C. F. LAGANKE
WINDSHIELD CLEANING APPARATUS
Filed Dec. 15, 1923 3 Sheets-Sheet 3
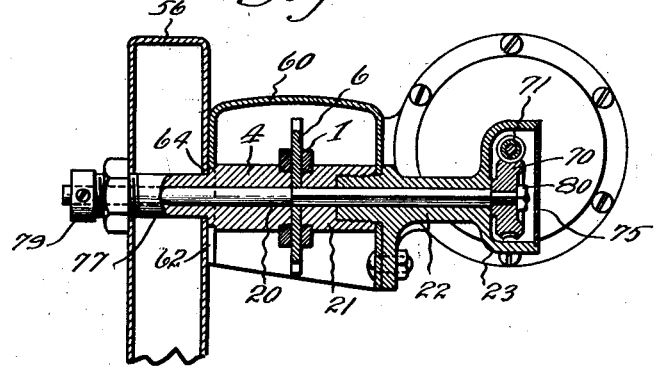
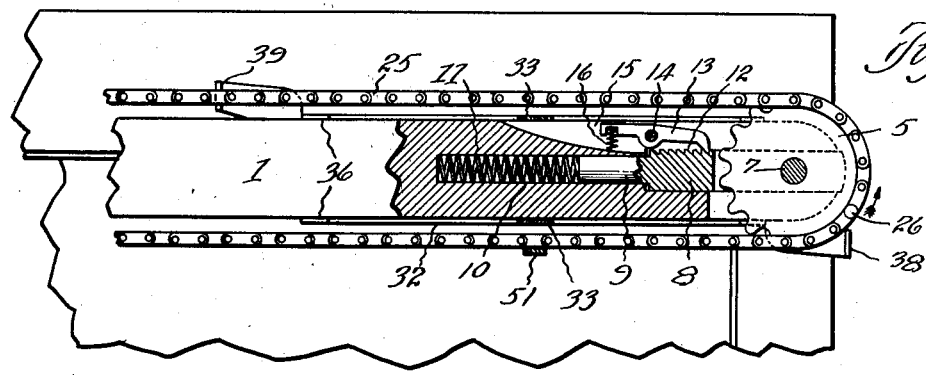
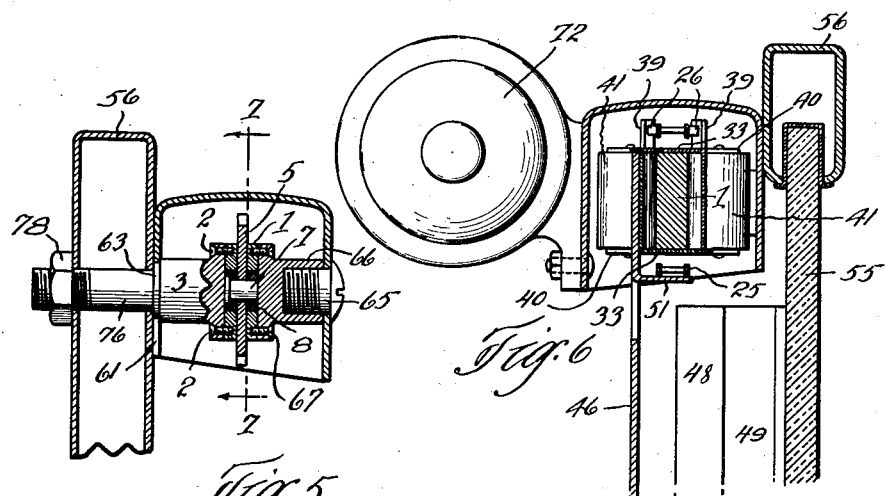
Inventor
Charles F. Laganke
By
Hull, Brock & West
Attys.

Patented Mar. 30, 1926.

1,578,531

UNITED STATES PATENT OFFICE.

CHARLES F. LAGANKE, OF CLEVELAND, OHIO.

WINDSHIELD-CLEANING APPARATUS.

Application filed December 15, 1923. Serial No. 680,792.

*To all whom it may concern:*

Be it known that I, CHARLES F. LAGANKE, a citizen of the United States, residing at Cleveland, in the county of Cuyahoga and State of Ohio, have invented a certain new and useful Improvement in Windshield-Cleaning Apparatus, of which the following is a full, clear, and exact description, reference being had to the accompanying drawings.

This invention relates to apparatus for removing rain, snow or other sight obstructing matter from the windshields of automotive vehicles or the lookout windows of other conveyances, and it has to do more particularly with that class of cleaning apparatus which cleans practically the entire width of the pane, thus affording a very wide angle of clear vision to the driver, as well as to other occupants of the vehicle.

The primary purpose of the invention is to provide, in apparatus of the class above referred to, instrumentalities for effectively accomplishing the purpose in view and which automatically adjust themselves to all mechanical and operative requirements, relieving the user of having to manually adjust or otherwise attend to the apparatus after it is once installed—except to lubricate it occasionally, and even in this regard I have endeavored, by the use of certain materials, to reduce this care to a minimum.

In general, the apparatus comprises a tram that is supported transversely of the surface to be cleaned; a trolley that traverses the tram, and a cleaner carried by the trolley and resiliently maintained in contact with said surface; a propelling element, as an endless actuator or chain for reciprocating the trolley along the tram, and consequently, the cleaner across the pane; and means, as a suitable motor, for driving the propelling element or actuator constantly in one direction.

Pursuant to the primary purpose above related, the invention comprehends the following objects: That of making the trolley elastic so that, notwithstanding the pressure of the wiper upon the pane, the trolley will not be caused to bind or cramp upon the tram but will move freely thereon at all times, and will, further, as a consequence of its elasticity, automatically take up any wear occurring between the cooperating parts of the trolley and the tram; that of providing effective means for automatically compensating for any change in condition, caused by continued use or wear, in the trolley propelling element, as, for instance, the stretching of the flexible actuator or chain; and that of so arranging and coordinating the various elements or instrumentalities that the wiper is caused to pause at each end of its course of travel across the pane, resulting in the two marked advantages, first, that of permitting the water or snow to drip from the wiper before its direction of movement is reversed and thus preventing the cleaned surface from being smeared and, second, that of relieving the motor of a constant carrying load.

Among other objects sought to be attained, are the provision of apparatus of the nature above set forth that is exceedingly simple; that is very durable; that is dependable in its operation and highly efficient, and that, according to the present embodiment, is self-contained so to speak, to the end that it may be conveniently applied to the windshield of a vehicle as a single unit without danger of disarranging the parts. By reason of its simplicity, durability, and dependableness and its self adjusting qualities above referred to and later to be more particularly pointed out, the care of the apparatus is reduced to a minimum.

To the attainment of the foregoing desiderata, the invention may be defined as consisting of the combination and arrangement of parts set out in the claims annexed hereto, and illustrated in their present preferred embodiment in the drawings accompanying and forming a part hereof, and wherein Fig. 1 is a front elevation of a windshield having my improved cleaning apparatus applied thereto; Fig. 2 is a similar view on a considerably larger scale showing the apparatus with the casing removed so as to reveal certain of the operating parts; Fig. 3 is a plan of what is shown in Fig. 2; Figs. 4 and 5 are sections on the respective correspondingly numbered lines of Fig. 1, and on a scale considerably enlarged over that of the preceding views; Fig. 6 is a transverse section through the apparatus and adjacent portion of the windshield on the lines 6—6 of Figs. 1 and 2; Fig. 7 is a sectional front elevation of the right hand end of the apparatus, with the casing omitted, the plane of section being indicated by the line 7—7 of Fig. 5; and Fig. 8 shows, in perspective, the separated front and rear plates of the trolley.

The apparatus comprises a tram 1 which preferably is rectangular in cross section, as best shown in Fig. 6, and is rounded at its opposite ends as shown in Figs. 2 and 7. To the rear side of the right hand end of the tram is attached, as by screws 2, a stud 3. (See Fig. 5.) A stud 4 is applied to the rear side of the left hand end of the tram (see Fig. 4) as by having its forward end reduced and threaded into a tapped aperture of the tram. A vertical kerf is formed in each end of the tram within which is received a sprocket wheel, the wheel occurring at the right hand end being designated 5, and the one at the left hand end being designated 6. The kerfs are of a width and depth sufficient to insure free rotation of the wheels.

The sprocket wheel 5 is journaled upon a pin 7 which extends transversely through a slide 8 having a kerf, similar to that of the tram, for the accommodation of said sprocket wheel. At its inner end the slide 8 terminates in a shank 9 which enters a bore 10 in the tram. Between the inner end of the bore and the opposed end of the shank 9 is interposed a compression spring 11. Cooperating with ratchet teeth 12 formed on the upper side of the slide 8 is the nose of a pawl 13 which is pivotally supported upon a pin 14 in a cut away portion 15 of the tram, and by means of a spring 16 the pawl is rocked in a direction to engage its nose with the teeth 12. This construction is clearly shown in Fig. 7.

The sprocket wheel 6 is secured to a shaft 20 (see Fig. 4) that is journaled within a bore of the stud 4 and within the aligning bores of an extension 21 that is applied to the front side of the left hand end of the tram 1 in like manner as the stud 4 is applied to the rear side thereof, and within the neck portion 22 of a casing 23 that has its rear end reduced and threaded into a recess in the forward end of the extension 21. As a convenient means of securing the sprocket wheel against rotation to the shaft 20, the shaft is shown as having a squared portion, and the sprocket has a similarly shaped aperture within which the squared portion of the shaft fits.

Engaged about the sprockets 5 and 6 is an endless flexible actuator or chain 25. The actuator or chain carries a driving element 26 in the nature of protuberances which project forwardly and rearwardly from the chain.

Reciprocably supported upon the tram 1 is a trolley which is designated generally by the numeral 30 and the same is composed of substantially identical front and rear plates 31 and 32, respectively, shown in perspective in Fig. 8. The blanks form which these plates are formed are precisely the same and, when formed, the lateral projections of one extend in a reverse direction to the corresponding projections of the other. At its longitudinal center, each plate is provided with a tongue 33. The tongue extends laterally from one edge of the plate and ends in a head that is separated from the body portion of the tongue by a neck 34 that is of a length substantially equal to the thickness of the metal whereof the plate is made. Directly opposite the tongue 33, the other edge of the plate is provided with a notch 35 which corresponds in width to the neck 34. At the extreme ends of the body portions of the plates are inwardly directed ears 36. At the lower right hand end and at the upper left hand end of the trolley, the side plates 31 and 32 have longitudinal extensions which are turned inwardly at their ends to form lugs, those at the right hand end being designated 38, and those at the left hand end, 39. Turned outwardly from the top and bottom edges of the plates 31 and 32 are brackets 40 by and between which rollers 41 are rotatably supported, and the rollers project inwardly through slots 42 a suitable distance beyond the inner surfaces of the plates.

In assembling the trolley, the side plates 31 and 32 are held in parallel planes with the rear plate slightly above the front plate and spaced apart a distance equal to the length of the body portions of the tongue 33. Then by a relative movement of the plates in the planes thereof and in opposite directions the necks 34 of the tongues 33 are brought into the notches 35. With the plates thus connected the trolley is slipped endwise upon the tram 1, the tram engaging with a sliding fit between the top and bottom lugs 36 and tongues 33. The tram then serves to hold the plates 31 and 32 against relative vertical movement and consequently maintains the trolley in assembled condition. The proportions of the parts are preferably such that when the trolley is mounted upon the tram, the front and rear plates are placed under tension with the rollers 41 bearing with a proper degree of pressure upon the front and rear sides of the tram.

Secured to the front plate 31, as by means of screws 45, is a wiper carrying arm 46 which terminates at its lower end in rearwardly diverging wings 47 between which a metallic sheath 48 of a wiper 49 of suitable material, such as rubber, is engaged. A pin 50 is extended through aligning holes in the wings 47 and sheath 48 for loosely connecting the wiper to the arm 46 so that the former may reverse its position at each end of its stroke. A tongue 51 is struck from the arm 46 and turned inwardly to form a support for the lower reach of the endless actuator or chain 25.

From what has already been described it will be seen that, when the endless actuator or chain 25 is driven continually in the direction indicated by the arrows in Figs. 2 and 7, the trolley 30 will be moved from end to end of the tram and the wiper reciprocated across the pane 55 of the windshield to within a comparatively short distance of the side members of the frame 56 thereof. To be more specific, as the driving element 26 of the actuator or chain 25 moves along the under side of the tram 1, it will contact with the lugs 38 and move the trolley to the right until said lugs are disposed beyond the reach of the driving element when said element will withdraw from said lugs, as shown in Fig. 7, and travel about the sprocket wheel 5 to the upper side of the tram. As the driving element moves along the latter side of the tram it will contact with the lugs 39 and propel the trolley in the opposite direction until these lugs are beyond the reach of the driving element. It will be noted that at each end of the course of travel of the trolley, the driving element is entirely free therefrom for a period of time.

To conceal the working parts above described, and protect them from the elements, they may be enclosed within a casing 60 which is designed to fit down over the parts. The rear wall of the casing is notched at 61 and 62 to embrace reduced portions 63 and 64 of the respective studs 3 and 4 (see Figs. 4 and 5). The left hand end of the front wall of the casing has an aperture through which the threaded extension of the neck 22 of the casing 23 is engaged so that the wall may be clamped between the flanged inner end of said neck and the stud extension 21, and at its opposite end said wall has an aperture through which a screw 65 is engaged and threaded into an extension 66 that is secured, as by screws 67, to the front side of the right hand end of the tram. Within the casing 23 is a worm gear 70 that is secured to the forward end of the shaft 20. Meshing with said gear is a worm 71 on the shaft of a motor 72. The casing 23 is shown as having a sleeve extension 73 which houses the motor shaft and which joins the adjacent end plate 74 of the motor casing. The open front of the casing 23 is shown as closed by a plate 75.

The entire structure, as a self-contained unit, is adapted to be attached to the windshield frame 56 by projecting the shanks 76 and 77 of the respective studs 3 and 4 through holes in the frame and applying nuts 78 to the threaded ends thereof. To provide ample bearing for the shaft 20 the stud 4 is shown as being tubular so that the shaft may be extended through it and have secured to its inner end a collar 79. This collar, with the nut 80 that is screwed onto the forward end of the shaft 20 beyond the wheel 70, holds the shaft against endwise displacement.

Any slack occurring within the endless actuator or chain 25, caused by wear or by stretching, is automatically taken up by the outward movement of the slide 8 through the action of the spring 11; and upon the slide being moved outwardly a distance equal to the space between adjacent ratchet teeth 12, it is effectively held against retraction by the pawl 14. Consequently, the axes of the sprocket wheels 5 and 6 are held at all times against any appreciable movement toward each other (at no time greater than the space between adjacent teeth 12), while they may separate by virtue of the automatic adjustment to compensate for any change of condition occurring within the actuator or chain 25.

Wear occurring between the rollers 41 and the tram 1 is automatically taken up through the inherent resiliency of the plates 31 and 32. To reduce the need of lubrication to a minimum the plates 31 and 32 are made of brass or similar material, while the tram is made of steel, it being well known that such metals may slidably engage with need of less lubrication than in a case of steel against steel, for example.

By reason of its elasticity, due to the resiliency of the plates 31 and 32, the trolley may warp or twist considerably without affecting the bearing of the rollers 41 upon the tram. In other words, although the wiper carrying arm may be placed under considerable tension and the plates 31 and 32 sprung materially, said rollers will bear evenly from end to end transversely of the tram and prevent the trolley from cramping or binding upon the tram. This even bearing of the rollers upon the front and rear flat sides of the tram insures free movement of the trolley along the tram at all times, regardless of the pressure of the wiper on the pane, as proven by extensive experimentation.

An advantage arising from the fact that the trolley is not connected to the endless actuator or chain 25 is that the wiper and trolley may be shifted by hand to one end or the other of the windshield pane, the direction depending on whether the driving element 26 is above or below the tram. This enables one, when washing the windshield, to move the cleaner out of the way instead of having to lift the wiper from the surface of the pane for the purpose of getting a cloth under it, thereby springing the wiper carrying arm to such an extent that the pressure of the wiper is materially weakened or destroyed. Also it enables the wiper to be shifted to the end of the windshield when not in use if left elsewhere when the motor is stopped.

Also, by reason of the fact that the driving element 26 is entirely free from the trolley while passing from either side of its orbital course of movement to the other, the motor is periodically relieved of its load and thus permitted to gain speed which is utilized to advantage in starting the trolley from a standing position and initiate its reverse movement. As a consequence of this, there is a less demand on the supply of electric current than there would be otherwise.

Another point which I desire to emphasize, is the simplicity of construction of the trolley and the ease and quickness with which it may be assembled, the operation requiring no fastening means other than the integral interlocking parts of the front and rear plates, the tram serving solely to maintain the plates in assembled condition after they are connected together and applied to the tram as hereinbefore described. In fact, in the designing of the entire apparatus I have had in mind expediting and cheapening manufacture, facilitating installation, minimizing the care and attention required to maintain the apparatus in perfect working condition, and ease of operation, with its resultant saving of current.

Having thus described my invention, what I claim is:—

1. In apparatus adapted for attachment to a windshield or the like for cleaning the surface thereof, the combination of a driving element movable through an orbital course and arranged to be supported adjacent said surface, means for moving said element constantly in a given direction, a tram supported within the plane, and wholly inside the orbital course of movement, of the driving element, and an instrumentality supported by and reciprocable along the tram crosswise of the surface and adapted to carry a wiper in contact with said surface, said instrumentality incorporating spaced abutments wherewith said driving element is arranged to contact in alternation, each abutment moving beyond the reach of said element before the element contacts with the other.

2. In apparatus adapted for attachment to a windshield or the like for cleaning the surface thereof, the combination of a tram arranged to be supported adjacent said surface, a trolley movable along said tram, the trolley being adapted to carry a wiper in contact with the surface, a driving element movable through an orbital course along the opposite sides and across the ends of said tram, and means for moving said element constantly in a given direction, the trolley having abutments spaced apart longitudinally of the tram and with one of which said element contacts when moving along one side of the tram until said abutment moves beyond the reach of said element and with the other of which said element contacts when moving along the other side of the tram until said abutment moves beyond the reach of said element.

3. In apparatus adapted for attachment to a windshield or the like for cleaning the surface thereof, the combination of a tram arranged to be supported adjacent said surface, a trolley reciprocable along said tram and involving parts yieldingly engaging the opposite sides of the tram, the trolley being adapted to support a wiper in contact with the aforesaid surface, and means for reciprocating the trolley along the tram.

4. In apparatus adapted for attachment to a windshield or the like for cleaning the surface thereof, the combination of a tram arranged to be supported adjacent said surface, a trolley reciprocable along said tram and involving parts engaging the top and bottom of the tram and other parts yieldingly engaging the opposite sides of the tram, the trolley being adapted to support a wiper in contact with the aforesaid surface, and means for reciprocating the trolley along the tram.

5. In apparatus adapted for attachment to a windshield or the like for cleaning the surface thereof, the combination of a tram arranged to be supported adjacent said surface, a trolley supported by said tram and comprising opposed plates disposed on opposite sides of the tram, said plates being resilient and connected together at substantially their longitudinal centers, rollers carried by the respective plates and engaging the adjacent sides of the tram, the trolley being adapted to support a wiper in contact with the aforesaid surface, and means for reciprocating the trolley along the tram.

6. In apparatus adapted for attachment to a windshield or the like for cleaning the surface thereof, the combination of a tram arranged to be supported adjacent said surface, a trolley supported by said tram and comprising opposed plates disposed on opposite sides of the tram, said plates being resilient and connected together at substantially their longitudinal centers, rollers carried by the respective plates and engaging the adjacent sides of the tram, the plates involving parts overlying the top and bottom of the tram, the trolley being adapted to support a wiper in contact with the aforesaid surface, and means for reciprocating the trolley along the tram.

7. In apparatus adapted for attachment to a windshield or the like for cleaning the surface thereof, the combination of a tram arranged to be supported adjacent said surface, a trolley supported by the tram and comprising front and rear resilient plates, the plates being connected together at substantially their longitudinal centers above and below the tram, rollers carried by the end portions of said plates and engaging the front and rear sides of the tram, the parts being so proportioned that said plates are placed under tension by reason of the engagement of said rollers with the tram, the trolley being adapted to support a wiper in contact with the aforesaid surface, and means for reciprocating the trolley along the tram.

8. In apparatus adapted for attachment to a windshield or the like for cleaning the surface thereof, the combination of a tram arranged to be supported adjacent said surface, a trolley supported by the tram and comprising front and rear resilient plates, the plates being connected together at substantially their longitudinal centers above and below the tram, rollers carried by the end portions of said plates and engaging the front and rear sides of the tram, the parts being so proportioned that said plates are placed under tension by reason of the engagement of said rollers with the tram, the trolley being adapted to support a wiper in contact with the aforesaid surface, and means for reciprocating the trolley along the tram.

9. In apparatus adapted for attachment to a windshield or the like for cleaning the surface thereof, the combination of a tram arranged to be supported adjacent said surface, said tram being rectangular in cross section, a trolley supported by the tram and comprising front and rear resilient plates that are connected together above and below the tram at substantially their longitudinal centers, rollers carried by the ends of the plates and engaging the front and rear sides of the tram throughout substantially the width of the tram, the parts being so proportioned that the plates are placed under tension by the engagement of the rollers with the tram, the plates having parts overlying the top and bottom edges of the tram, the trolley being adapted to support a wiper in contact with the aforesaid surface, and means for reciprocating the trolley along the tram.

10. In apparatus adapted for attachment to a windshield or the like for cleaning the surface thereof, the combination of a tram arranged to be supported adjacent said surface, said tram being rectangular in cross section, a trolley supported by the tram and comprising substantially identical front and rear plates disposed on opposite sides of the tram, the respective plates having above and below the tram a tongue extending across the tram and terminating in a head that is spaced from the body portion of the tongue by a neck, each plate having a notch for the reception of the neck of the tongue that is carried by the other plate whereby said plates are held together, rollers carried by the end portions of the plates and engaging the opposite sides of the tram, the trolley being adapted to support a wiper in contact with the aforesaid surface, and means for reciprocating the trolley along the tram.

11. In apparatus adapted for attachment to a windshield or the like for cleaning the surface thereof, the combination of a tram arranged to be supported adjacent said surface, a trolley supported by the tram and comprising front and rear plates disposed on opposite sides of the tram, means connecting said plates together at substantially their longitudinal centers, the plates involving brackets which extend forwardly and rearwardly from the respective front and rear plates and arranged in pairs, the brackets of each pair being in substantially vertical alignment, a roller supported by and between the brackets of each pair, the plates having slots through which said rollers project and engage the tram, the trolley being adapted to support a wiper in contact with the aforesaid surface, and means for reciprocating the trolley along the tram.

12. In apparatus adapted for attachment to a windshield or the like for cleaning the surface thereof, the combination of a tram arranged to be supported adjacent said surface, a trolley reciprocable along the tram, an endless actuator, guides supporting the actuator with its orbit in a substantially vertical plane, means for effecting driving connections between the trolley and the actuator, the trolley incorporating means for supporting a wiper in contact with the aforesaid surface, the last mentioned means involving a support for the lower reach of the actuator.

13. In apparatus adapted for attachment to a windshield or the like for cleaning the surface thereof, the combination of a tram arranged to be supported adjacent said surface, a trolley reciprocable along the tram, an endless actuator, guides supporting said actuator in substantially the plane of the tram with one reach disposed above and the other below the tram, an arm depending from the trolley, and adapted to support a wiper in contact with the aforesaid surface, the arm having an inwardly directed tongue whereon the lower reach of the actuator is adapted to be supported.

14. In apparatus adapted for attachment to a windshield or the like for cleaning the surface thereof, the combination of a tram arranged to be supported adjacent said surface, said tram having kerfs at its opposite ends, wheels rotatably supported within the kerfs, an endless actuator engaged over and supported by said wheels with one reach above and the other below the tram, a trolley reciprocable along the tram and wherewith the actuator is adapted to have driving connection, the trolley being adapted to support a wiper in cleaning contact with the aforesaid surface.

15. In apparatus adapted for attachment to a windshield or the like for cleaning the surface thereof, the combination of a tram arranged to be supported adjacent said surface, said tram having vertical kerfs in its opposite ends, wheels rotatably supported within said kerfs, an endless actuator engaged about said wheels, a trolley reciprocable along the tram, said trolley having abutments, one below and one above the tram, a driving element carried by the actuator for contact with said abutments, the trolley being adapted to support a wiper in cleaning contact with said surface.

16. In apparatus adapted for attachment to a windshield or the like for cleaning the surface thereof, the combination of a tram arranged to be supported adjacent said surface, said tram having kerfs at its opposite ends, a slide movably carried by one end of the tram and having a kerf registering with the corresponding kerf of the tram, a wheel rotatably supported within the other kerf of the tram, a wheel rotatably supported within the kerf of the slide, means tending to move the slide outwardly, an endless actuator engaged about said wheels, a trolley reciprocable along the tram, means through which driving connection is effected between the actuator and trolley, the trolley being adapted to support a wiper in cleaning contact with the aforesaid surface.

17. In apparatus adapted for attachment to a windshield or the like for cleaning the surface thereof, the combination of a tram arranged to be supported adjacent said surface, said tram having kerfs at its opposite ends, a slide movably carried by one end of the tram and having a kerf registering with the corresponding kerf of the tram, a wheel rotatably supported within the other kerf of the tram, a wheel rotatably supported within the kerf of the slide, means tending to move the slide outwardly, further means preventing retraction of the slide, an endless actuator engaged about said wheels, a trolley reciprocable along the tram, means through which driving connection is effected between the actuator and trolley, the trolley being adapted to support a wiper in cleaning contact with the adjacent surface.

18. In apparatus adapted for attachment to a windshield or the like for cleaning the surface thereof, the combination of a tram having means for attaching it to the frame of a windshield, said means involving a tubular stud adapted to be extended through the windshield frame, a drive shaft projecting through the tubular stud, wheels rotatably supported adjacent the opposite ends of the tram, driving connections between said shaft and one of said wheels, means for driving the shaft, an endless actuator engaged over said wheels, a trolley reciprocable along the tram, means operatively connecting the actuator to the trolley, the trolley being adapted to support a wiper in cleaning contact with the pane of the windshield.

19. In apparatus adapted for attachment to a windshield or the like for cleaning the surface thereof, the combination of a tram having studs at its opposite ends, the studs being arranged for engagement through openings in the frame of a windshield, one of said studs being tubular, a drive shaft extending through the tubular stud, wheels rotatably supported adjacent the opposite ends of the tram, driving connections between said shaft and one of said wheels, means for driving the shaft, an endless actuator engaged over said wheels, a trolley reciprocable along the tram, means operatively connecting the actuator to the trolley, the trolley being adapted to support a wiper in cleaning contact with the pane of the windshield.

20. In apparatus adapted for attachment to a windshield or the like for cleaning the surface thereof, the combination of a tram having means at one end for supporting it from the frame of a windshield and having at its opposite end a hollow stud adapted to be extended through said frame, the end of the tram adjacent said stud having a kerf, a shaft extending through the stud and rotatably supported thereby, means for driving the shaft, a wheel within the kerf of the tram and secured to the said shaft, a wheel supported adjacent the opposite end of the tram, an endless actuator engaged about said wheels, a trolley reciprocable along the tram, means effecting a driving connection between the actuator and the trolley, the trolley being adapted to support a wiper in cleaning contact with the pane of the windshield.

21. In apparatus adapted for attachment to a windshield or the like for cleaning the surface thereof, the combination of a unitary structure comprising a tram, an endless actuator supported adjacent the tram, a trolley consisting of a resilient structure yieldingly engaging and reciprocable along the tram, means for effecting driving connection between the trolley and the actuator, the trolley being adapted to support a wiper in cleaning contact with the pane of the windshield, a motor for driving the actuator, and means disposed adjacent each end of the structure for securing it to a windshield frame.

In testimony whereof, I hereunto affix my signature.

CHARLES F. LAGANKE.